J. L. CHESNUTT.
SWIVEL CASTER.
APPLICATION FILED APR. 30, 1921.
1,392,913.
Patented Oct. 11, 1921.
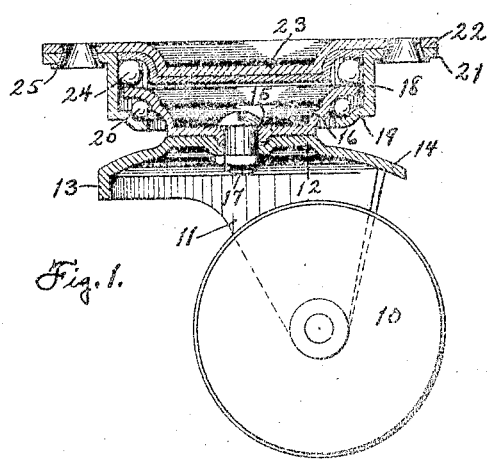
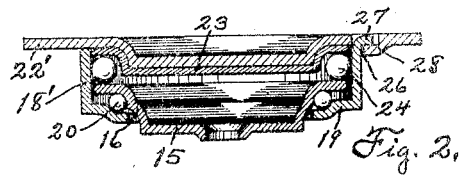
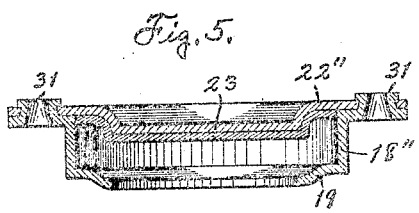
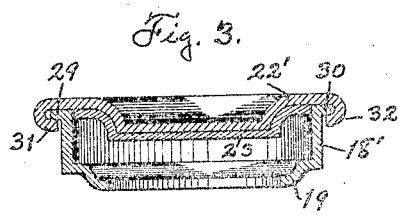
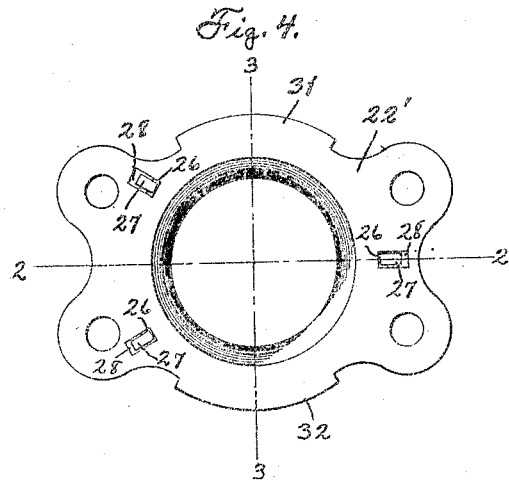
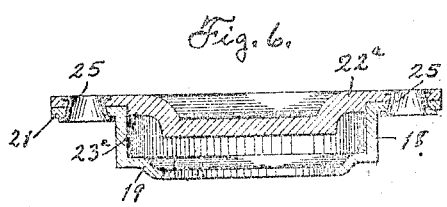
INVENTOR:
J. L. CHESNUTT
By Earl M. Sinclair
Atty.

UNITED STATES PATENT OFFICE.

JOHN LOUCIEN CHESNUTT, OF LONG BEACH, CALIFORNIA.

SWIVEL-CASTER.

1,392,913. Specification of Letters Patent. Patented Oct. 11, 1921.

Application filed April 30, 1921. Serial No. 465,886.

*To all whom it may concern:*

Be it known that I, JOHN LOUCIEN CHESNUTT, a citizen of the United States of America, and resident of Long Beach, Los Angeles county, California, have invented a new and useful Swivel-Caster, of which the following is a specification.

The object of this invention is to provide an improved swivel caster so constructed as to prevent the entrance of dirt and other foreign substances to the working parts.

A further object of this invention is to provide an improved construction for a swivel caster having superior swiveling qualities and being relatively simple in construction and inexpensive of manufacture.

A further object of this invention is to provide improved means for connecting the top plate to other caster parts.

A further object of this invention is to provide an improved swivel caster having a double row of bearing balls, one receiving vertical pressure only and the other lateral pressure only, each of said rows of balls being of relatively large diameter.

A further object of this invention is to provide a swivel caster having improved means of connection between swiveling and stationary members, permitting relatively large ball race for the balls receiving lateral pressure and acting as an anti-friction retainer of the swiveling member thereby reducing leverage and consequent strain, friction and wear.

A further object of this invention is to provide a swivel caster having separable or detachable parts, thus facilitating the renewal of worn or broken members.

A further object of this invention is to produce a swivel caster adapted to be attached to a flat surface and having a high degree of swiveling efficiency so that the supporting wheel may be set very near to the vertical axis of the device, thus reducing strain and wear on the parts in use.

A further object of this invention is to provide an improved swivel caster having efficient anti-friction connecting means between the stationary and swiveling parts, contributing to ease of operation and long life of the parts.

A further object of this invention is to provide an improved swiveling construction for a caster adapted for easy connection to wheel carrying yokes or members of various sizes and shapes and designed to carry one wheel or multiple wheels of any desired size and shape, thus permitting an economical adaptation of the caster to a wide variety of uses and conditions.

A further object of this invention is to provide an improved swivel caster having ample storage capacity for lubricating grease affording constant lubrication over long periods.

With these and other objects in view, my invention consists in the construction, arrangement and combination of elements hereinafter set forth, pointed out in my claims and illustrated by the accompanying drawing, in which—

Figure 1 is a vertical section of a swivel caster embodying my invention and showing one means for connecting the containing member or shell to the top plate.

Fig. 2 is a vertical section of a part of the device showing a different connecting means.

Fig. 3 is a vertical section showing still further connecting means.

Fig. 4 is a plan view illustrating both of the forms of connecting means shown in Figs. 2 and 3.

Fig. 5 is a vertical section illustrating a further modified form of connecting means.

Fig. 6 is a vertical section illustrating the top plate and centering disk formed integrally by casting.

In the construction of the device as shown particularly in Fig. 1, a wheel 10, which may be of any desired and suitable construction, is rotatably mounted in a wheel yoke comprising spaced forks or wings 11, one of which is shown, and a plate or top 12, which is substantially horizontal, particularly in its central portion. The wings 11 preferably taper toward their lower ends and the axis of rotation of the wheel 10 is arranged at the rear of the vertical axis of the device so that the wheel trails in use, thereby automatically inducing swiveling of the caster when the direction of travel is changed. The plate 12 preferably is formed with a downwardly extending flange 13 at its forward side, connecting the upper ends of the wings 11, and also preferably projects rearwardly beyond the rear margins of said wings and in overhanging relation to the wheel, at the point indicated by the numeral 14. This construction greatly strengthens the wheel yoke. A swiveling retaining member of circular form is provided, comprising a central substantially plane portion 15 having an upwardly and outwardly flared peripheral portion 16, of annular form. The central portion 15 of the retaining member is mounted on the central portion of the top 12 of the wheel yoke and is rigidly secured thereto by a central bolt 17 or other suitable securing member. If desired the central portion 15 of the retaining member may be formed at its center with a downwardly projecting boss extending within a countersink in the top member 12, to assist in keeping said members centered and to take some of the lateral strain from the member 17. The flaring portion 16 of the retaining member extends within a cylindrical shell 18, formed at its lower end with an inwardly directed peripheral flange 19 extending beneath said flared portion. The flange 19 is grooved or downset at its inner margin to form an annular raceway for a series of bearing balls 20, which also contact the lower surface of the flared portion 16 of the retaining member. The inner portion of the flange 19 and outer portion of the flared portion 16 extend beyond the row of balls 20 on lines spaced from and substantially parallel with horizontal lines tangential to said balls, and each of said members contacts said balls, under normal conditions, only on curved surfaces having radii at substantially forty-five degrees to the vertical axis of the device. Because of this arrangement, there is, except possibly under very unusual circumstances, no downward pressure on the balls 20, which are designed to receive lateral strains only and not to carry any of the load.

The shell 18, which is comparatively shallow, is formed at its upper end with an outwardly extending horizontal flange 21. A top plate 22 is provided and is mounted on and secured in any suitable manner to the horizontal flange 21. The top plate 22 is countersunk in its central portion, into the space bounded by the upper end of the shell 18, and within the limits of said shell said top plate is imperforate. A centering disk 23 is fitted snugly into the upper end of the shell 18 and is countersunk in its central portion to conform to the top plate 22, said disk preferably contacting with the under surface of said top plate throughout its entire area. As previously indicated, the periphery of the flared portion 16 of the retaining member is substantially horizontal, and on such annular surface is mounted a row or ring 24 of bearing balls, which balls contact with and support the circumferential portion of the centering disk 23. This circumferential portion is horizontal and is of greater width than the diameter of the balls 24 so that said balls have some freedom of lateral movement and cannot receive lateral pinch or strain from the countersunk portion of said disk, which countersunk portion extends below the horizontal axis of said balls and prevents accidental removal of said balls from their course. It is the function of the series of balls 24 to carry all of the load or downward pressure exerted through the top plate, and object carried thereby, to the wheel-carrying yoke and members. The disk 23 serves to strengthen and reinforce the upper end of the shell 18 and prevent buckling or collapse thereof in use under heavy strains, and also increases the wearing qualities of the raceway for the balls 24 which carry the load.

It will be observed that both rows of balls 20 and 24 are relatively large in diameter, extending outside of and beyond the vertical plane of the axis of the wheel 10. This increases the effective bearing surface, lessens wear and extends the period of usefulness of the device, and also lessens the leverage and strain produced when the caster is traveling over obstructions or rough surfaces. No downward pressure would be applied to the lowermost balls 20 except perhaps temporarily when a serious or relatively great obstruction is encountered by the wheel, which obstruction would have to be so great as to lift the load upon the upper balls 24 at the rear of the ring and away from the upper balls in front, before the outer rim of the portion 16 could press downwardly upon the lower balls 20 in front.

In Fig. 1 the top plate and flange 21 of the shell are shown apertured in alinement and connected by means of a plurality of hollow rivets 25, which in this instance are tapered. The top plate and flange 21 may be of the same size and shape, one form being shown in Fig. 4, and the top plate is adapted to be secured in any desired manner to a load object. When constructed as shown in Fig. 1, the securing means may be passed upwardly through the hollow rivets 25 into the load object.

A different fastening means between the top plate and shell is shown in Figs. 2 and 4, in which the horizontal flange 21 of the latter member is omitted. In this construction the top plate 22′ is formed with a number of openings 26 of small dimension, into which project lugs 27 formed on the upper margin of the shell 18′. The surface of the top plate is also formed with depressions or seats 28 adjacent the holes 26 therein, and in assembling the parts the lugs 27, after being extended through said holes, are bent over into said seats, thus securing the members together and leaving a comparatively smooth upper surface for the top plate.

In Figs. 2 and 3 a still further form is shown in which the shell 18′ is formed with two diametrically opposite, relatively narrow flanges 29, 30 at its top, extending outwardly. The top plate 22′ is formed with diametrically opposite projections 31, 32, and in the operation of assembling the parts these projectins are bent and pressed over and around the flanges 29, 30 of the shell, as shown in Fig. 3, to secure said members together.

In Fig. 5 a form is shown which is particularly adaptable when the shell 18″ and top plate 22″ are formed by pressing and stamping, said members being formed more as shown and described in connection with Fig. 1, that is to say with registering holes in the top plate and the horizontal flange 21 of the shell. One of said members may be formed with a bur 31 around the hole therein, which bur is adapted to be extended into a hole in the other member and there riveted or upset so as to secure the members together.

Either of the forms illustrated and described may be employed for connecting the shell and top plate, and in some instances, if deemed necessary for strength, two of the forms may be employed conjunctively and as complementary to each other, as shown in Fig. 4.

No dirt or other foreign substances can enter the caster from the top, on account of the protection afforded by the imperforate top plate, and as the annular space between the lower flange 19 of the shell and the retaining member is very narrow, and opens upwardly, there is little danger of foreign substances entering by that route.

At times the top plate may be made by casting from metal, in which event the disk 23 may be made integral therewith, in which form as to fit down snugly and tightly within the upper end of the shell, as shown in Fig. 6.

A standard form and size of upper structure, including the top plate, shell and retaining member, with the anti-friction devices therein, may be used with a variety of sizes and shapes of wheel supporting yokes, and such yokes may carry wheels of single, double or multiple construction and of any desired size and shape. This makes for economy in production and facility of adaptation to various uses.

The space within the cupped retaining member 15—16 is ample for a sufficient quantity of grease to lubricate the movable parts over a long period, which grease works, in use, into the raceways and between the bearing balls.

The parts are separable, by removal of the bolt or screw 17, thus facilitating the replacement of worn or broken parts and lengthening the life of the whole device.

I claim as my invention—

1. A swivel caster, comprising a wheel yoke, a wheel journaled therein, a retaining member mounted on and fixed rigidly to said wheel yoke and having an outwardly projecting flange portion, a shell mounted concentrically of said retaining member and having at its lower end a flange projecting beneath the flange portion thereof, bearing balls between said flange and flange portion adapted to receive lateral pressure only, a top plate on said shell, means for securing said top plate to said shell, a disk pressed rigidly and snugly into the upper end of said shell beneath said top plate, said disk being countersunk in its central portion whereby an annular peripheral horizontal track is formed, and a series of bearing balls mounted between said annular peripheral track and the flange portion of the retaining member, said annular peripheral track being of greater width than the diameter of said balls whereby the latter receive downward pressure only.

2. A swivel caster, comprising a wheel yoke, a wheel pivoted therein, a retaining member mounted on and fixed rigidly to said wheel yoke and having an outwardly projecting flange portion terminating in an annular peripheral horizontal track, a shell mounted concentrically of said retaining member and having at its lower margin a flange projecting inwardly beneath the flange portion of said retaining member, a series of bearing balls between said flange and flange portion adapted to receive lateral pressure only, a top plate on said shell, means for securing said top plate to said shell, a disk mounted snugly within the upper end of said shell in contact with said top plate, said top plate and disk being countersunk in their central portions and formed with an annular plane portion circumferentially of said countersink, and a series of bearing balls between the annular plane portion of said disk and the annular horizontal track portion of said retaining member, the annular plane portion of said disk being wider than the diameter of said latter balls, whereby said balls have a freedom of lateral movement and receive downward pressure only.

3. In a swivel caster, a wheel yoke, a wheel pivoted therein and trailing relative to the vertical axis of said caster, a retaining member of circular form secured rigidly on said wheel yoke, a shell mounted concentrically of said retaining member and formed with a flange at its lower margin extending beneath said retaining member, a row of bearing balls on said flange and contacting said retaining member, said balls adapted to receive lateral pressure only, a top plate on and secured to said shell, a row of balls on said retaining member in contact with said top plate and receiving vertical pressure only, both rows of balls being of relatively large diameter and extending outside of the vertical plane of the axis of rotation of said wheel.

4. In a swivel caster, a wheel yoke, a wheel pivoted therein, a circular retaining member secured rigidly on said wheel yoke, said retaining member being formed with an upwardly and outwardly extending flange portion, a shell mounted concentrically of said retaining member and formed at its lower margin with a flange extending inwardly beneath the flange portion of said retaining member, a series of balls mounted between said flange and flange portion and contacting concaved surfaces thereof, said flange and flange portion each extending beyond said balls on substantially horizontal lines parallel with and spaced from lines tangential to said balls, whereby pressure is exerted on said balls on oblique lines and said balls receive lateral strain and pressure only, a top plate on and secured to the upper end of said shell, and another row of bearing balls between said retaining member and top plate receiving vertical pressure only.

5. In a swivel caster, a cylindrical shell, means for attaching said shell to a load object, a wheel yoke and wheel pivoted therein, a member secured to said yoke and extending within and rotatable relative to said shell, anti-friction devices between said shell and member, a disk fitting snugly within the upper end of said shell, and anti-friction devices between said disk and said member.

6. In a swivel caster, a wheel yoke, a wheel pivoted therein, said yoke having a circular horizontal portion at its top, a retaining member having a circular portion contacting with such horizontal portion of the yoke, a screw or bolt rigidly securing said members together centrally of their contacting portions, said retaining member also extending upwardly and outwardly in a flange portion, a shell mounted concentrically of said retaining member and adapted to be secured to a load object, said shell being formed at its lower margin with an inwardly projecting flange beneath the flange portion of said retaining member, bearing balls in a relatively large ring between said flange and flange portion, a disk mounted rigidly in the upper end of said shell, and bearing balls in a relatively large ring between said flange portion and disk.

Signed at Des Moines, in the county of Polk and State of Iowa, this 8″ day of April, 1921.

JOHN LOUCIEN CHESNUTT.